US011136465B2

(12) United States Patent
Qian et al.

(10) Patent No.: US 11,136,465 B2
(45) Date of Patent: Oct. 5, 2021

(54) AQUEOUS COATING COMPOSITION

(71) Applicants: Dow Global Technologies LLC, Midland, MI (US); Rohm and Haas Company, Collegeville, PA (US)

(72) Inventors: Zhen Qian, Anhui (CN); Yaguang Zhao, Shanghai (CN); Jianming Xu, Shanghai (CN); Qingwei Zhang, Shanghai (CN); Wei Li, Shanghai (CN); Ling Li, Blue Bell, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 287 days.

(21) Appl. No.: 16/341,461

(22) PCT Filed: Nov. 11, 2016

(86) PCT No.: PCT/CN2016/105426
§ 371 (c)(1),
(2) Date: Apr. 12, 2019

(87) PCT Pub. No.: WO2018/086055
PCT Pub. Date: May 17, 2018

(65) Prior Publication Data
US 2020/0002548 A1 Jan. 2, 2020

(51) Int. Cl.
C09D 5/02 (2006.01)
C09D 4/06 (2006.01)
C09D 133/06 (2006.01)

(52) U.S. Cl.
CPC .............. *C09D 5/025* (2013.01); *C09D 4/06* (2013.01); *C09D 5/022* (2013.01); *C09D 133/064* (2013.01)

(58) Field of Classification Search
CPC .......... C09D 5/025; C09D 5/022; C09D 4/06; C09D 133/64
USPC ........................................................ 524/560
See application file for complete search history.

(56) References Cited

U.S. PATENT DOCUMENTS

| 2,923,686 | A | | 2/1960 | Ohlmann | |
|---|---|---|---|---|---|
| 5,348,998 | A | * | 9/1994 | Ito | C09D 201/00 524/190 |
| 6,933,415 | B2 | * | 8/2005 | Zhao | C09D 5/024 524/425 |
| 7,745,567 | B2 | | 6/2010 | Carpenter et al. | |
| 8,119,717 | B2 | * | 2/2012 | Anchor | C09D 7/20 524/425 |
| 8,211,987 | B2 | | 7/2012 | Ahmadnian et al. | |
| 9,199,902 | B2 | * | 12/2015 | Ogasawara | C08F 2/26 |
| 10,457,754 | B2 | * | 10/2019 | Ogasawara | C08F 2/24 |
| 2003/0229171 | A1 | * | 12/2003 | Zhao | C09D 5/024 524/425 |
| 2008/0119600 | A1 | * | 5/2008 | Anchor | C09D 7/20 524/394 |
| 2014/0100331 | A1 | | 4/2014 | Ahrens | |
| 2014/0323753 | A1 | * | 10/2014 | Ogasawara | C08F 2/26 558/23 |
| 2015/0073080 | A1 | | 3/2015 | Wu et al. | |
| 2017/0327602 | A1 | * | 11/2017 | Ogasawara | C08F 2/24 |

FOREIGN PATENT DOCUMENTS

| CN | 1890334 A | | 1/2007 | |
|---|---|---|---|---|
| CN | 102702891 A | * | 10/2012 | |
| CN | 102702891 A | | 10/2012 | |
| CN | 102272214 B | | 10/2013 | |
| CN | 101977974 B | | 5/2014 | |
| CN | 104039901 A | | 9/2014 | |
| CN | 105669914 A | * | 6/2016 | |
| CN | 105669914 A | | 6/2016 | |
| EP | 2703433 A2 | | 3/2014 | |
| EP | 2703434 A2 | | 3/2014 | |
| GB | 1272464 A | | 4/1972 | |
| JP | 2013170211 A | | 9/2013 | |
| JP | 2013170211 A | * | 9/2013 | |
| WO | 2005054384 A1 | | 6/2005 | |
| WO | 2014201674 A1 | | 12/2014 | |
| WO | WO-2014201674 A1 | * | 12/2014 | ............. C09D 5/024 |

OTHER PUBLICATIONS

European Examination Report for the corresponding European Application No. 16921243.8, dated Jan. 19, 2021; 5 pages.
Chinese First Search Report for the corresponding Chinese Application No. 2016800904605, dated of Filing: Apr. 28, 2019; 1 page.
"Hitenol AR Series", Polymerizable Surfactants—Specifications, dated: Jun. 2, 2016; retrieved by the EPO: Dec. 7, 2020; 4 pages.

* cited by examiner

*Primary Examiner* — Michael Bernshteyn
(74) *Attorney, Agent, or Firm* — Karl E. Stauss; Cantor Colburn LLP

(57) ABSTRACT

An aqueous coating composition having good freeze-thaw stability and providing coatings with good stain resistance.

14 Claims, No Drawings

AQUEOUS COATING COMPOSITION

FIELD OF THE INVENTION

The present invention relates to a zero or low volatile organic compounds (VOCs) aqueous coating composition.

INTRODUCTION

Aqueous or waterborne coating compositions are becoming increasingly more important than solvent-based coating compositions for less environmental problems. The coating industry is always interested in developing coating compositions without or with substantially reduced VOC content, for example, aqueous coating compositions comprising not greater than 5 grams (g) of VOCs per liter of coating compositions. However, aqueous coating compositions, particularly low VOC paints and latex dispersions, usually suffer from a lack of freeze-thaw (F/T) stability, particularly during transportation and storage.

Addition of conventional anti-freeze agents to coating compositions can achieve freeze-thaw stability. Examples of these conventional anti-freeze agents include ethylene glycol (EG), propylene glycol (PG), diethylene glycol, and low boiling point coalescents. However, the zero or low VOC requirement means the level of these glycol derivatives or low boiling point coalescents that can be used has to be reduced or eliminated. Recently developed anti-freeze agents having no contribution to the VOC content, such as polyethylene glycol (PEG) and tristyrylphenol ethoxylate, can be used to improve F/T stability of coating compositions. For example, European Patent No. 2,703,434 discloses the use of alkoxylated tristyrylphenols or alkoxylated tributylphenols for improving freeze-thaw stability of latex dispersions and paint formulations. Unfortunately, the addition of these compounds hurt stain resistance of the resulting coatings. Some high-end applications require coatings having a total stain removal score of at least 60 as measured by the GB/T9780-2013 method.

Therefore, there is a need to develop an aqueous coating composition which meets the zero or low VOC requirement and provides an F/T stable coating composition without sacrificing the stain resistance of coatings obtained therefrom.

SUMMARY OF THE INVENTION

The present invention uses specific polyols as anti-freeze agents for an aqueous coating composition comprising a specific acrylic emulsion polymer. The aqueous coating composition of the present invention affords good freeze-thaw stability and provides coatings with good stain resistance as indicated by a total stain removal score of at least 60 according to the GB/T9780-2013 method. In the meanwhile, the aqueous coating composition has zero or low VOCs, that is, 5 g/L VOCs or less as measured by the GB 18582-2008 method. The GB/T 9780-2013 method herein is the national standard for test method for dirt pickup resistance and stain removal of films of architectural coatings and paints, which was issued on Nov. 27, 2013 and put into effect on Aug. 1, 2014. The GB 18582-2008 method herein is the national standard for indoor decorating and refurbishing materials-limit of harmful substances of interior architectural coatings, which was issued on Apr. 1, 2008 and put into effect on Oct. 1, 2008. The GB/T9780-2013 and GB 18582-2008 methods were both published by General Administration of Quality Supervision, Inspection and Quarantine of the P. R. China and Standardization Administration of the P. R. China.

In a first aspect, the present invention is an aqueous coating composition having a VOC content of 5 g/L or less, comprising:

an acrylic emulsion polymer comprising, as polymerized units, a polymerizable surfactant; and a polyoxypropylene polyol having a number average molecular weight of from 350 to 1,900.

In a second aspect, the present invention is a method of preparing an aqueous coating composition of the first aspect. The method comprises:

mixing an acrylic emulsion polymer with a polyoxypropylene polyol to form the aqueous coating composition;

wherein the acrylic emulsion polymer comprises, as polymerized units, a polymerizable surfactant; and the polyoxypropylene polyol has a number average molecular weight of from 350 to 1,900.

In a third aspect, the present invention is a method of imparting freeze-thaw stability to an acrylic emulsion polymer, comprising mixing the acrylic emulsion polymer with a polyoxypropylene polyol having a number average molecular weight of from 350 to 1,900, wherein the acrylic emulsion polymer comprises, as polymerized units, a polymerizable surfactant.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of Tg reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of homopolymer of $M_1$, and $T_g(M_2)$ is the glass transition temperature of homopolymer of $M_2$, all temperatures being in K. The glass transition temperatures of homopolymers may be found, for example, in "Polymer Handbook", edited by J. Brandrup and E. H. Immergut, Interscience Publishers.

The aqueous coating composition of the present invention may comprise one or more acrylic emulsion polymers. "Acrylic emulsion polymer" herein refers to an emulsion polymer comprising, as polymerized units, one or more acrylic monomers or their mixtures with other monomers including, for example, styrene or substituted styrene.

The acrylic emulsion polymer useful in the present invention may comprise, as polymerized units, one or more ethylenically unsaturated nonionic monomers. "Nonionic monomers" herein refer to monomers that do not bear an ionic charge between pH=1-14. Examples of suitable ethylenically unsaturated nonionic monomers include (meth) acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, and hydroxypropyl methacrylate; (meth)acrylonitrile; styrene and substituted styrene such as .alpha.-methyl styrene, p-methyl styrene, t-butyl styrene, vinyltoluene; butadiene; ethylene, propylene, and 1-decene; vinyl acetate, vinyl butyrate, vinyl versatate and other vinyl esters; vinyl monomers such as vinyl chloride and vinylidene chloride; or mixtures thereof. Preferred ethylenically unsaturated nonionic monomers are selected from styrene, butyl acrylate, or mixtures thereof. The acrylic emulsion polymer may comprise as polymerized units, based on the dry weight of the acrylic emulsion polymer, 60% by weight or more, 80% by weight or more, or even 90% by weight or more, and at the same time, 99.9% by weight or less, 97% by weight or less, or even 95% by weight or less, of the ethylenically unsaturated nonionic monomers.

The acrylic emulsion polymer useful in the present invention may further comprise, as polymerized units, one or more ethylenically unsaturated monomers having one or more functional groups. The functional groups may be selected from carbonyl, acetoacetate, alkoxysilane, ureido, amide, imide, amino group, carboxyl group, phosphorous group, or combinations thereof. Examples of such functional-group-containing ethylenically unsaturated monomer may include α,β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group (such as anhydride, (meth)acrylic anhydride, or maleic anhydride); vinyl phosphonic acid, allyl phosphonic acid, phosphoalkyl (meth)acrylates such as phosphoethyl (meth)acrylate, phosphopropyl (meth)acrylate, phosphobutyl (meth) acrylate, or salts thereof; 2-acrylamido-2-methyl-1-propanesulfonic acid; a sodium salt of 2-acrylamido-2-methyl-1-propanesulfonic acid; an ammonium salt of 2-acrylamido-2-methyl-1-propane sulfonic acid; sodium vinyl sulfonate; a sodium salt of allyl ether sulfonate; and the like; diacetone acrylamide (DAAM), acetoacetoxyethyl (meth)acrylate, acetoacetoxypropyl (meth)acrylate, acetoacetoxybutyl (meth)acrylate, 2,3-di(acetoacetoxy) propyl (meth)acrylate, allyl acetoacetates, or vinyl acetoacetates; monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide, or mixtures thereof. Preferred functional-group-containing ethylenically unsaturated monomers include arylamide, methacrylamide, diacetoneacrylamide, methylacrylamidoethyl ethylene urea, acetoacetoxyethyl methacrylate, vinyl trimethoxyl silane, 3-methacryloxypropyltrimethoxysilane, acrylic acid, methacrylic acid, or mixtures thereof. The acrylic emulsion polymer may comprise as polymerized units, based on the dry weight of the acrylic emulsion polymer, from 0 to 5% by weight, from 0.1% to 3% by weight, from 0.3% to 2.5% by weight, or from 0.5% to 2.0% by weight, of such functional-group-containing ethylenically unsaturated monomer.

The acrylic emulsion polymer useful in the present invention may further comprise, as polymerized units, one or more multiethylenically unsaturated monomers including di-, tri-, tetra-, or higher multifunctional ethylenically unsaturated monomers. Examples of suitable multiethylenically unsaturated monomers include butadiene, allyl(meth) acrylate, divinyl benzene, ethylene glycol dimethacrylate, butylene glycol dimethacrylate, or mixtures thereof. The acrylic emulsion polymer may comprise as polymerized units, based on the dry weight of the acrylic emulsion polymer, from 0 to 1% by weight, from 0 to 0.6% by weight, or from 0 to 0.2% by weight of the multiethylenically unsaturated monomer. Preferably, the acrylic emulsion polymer is substantially free (e.g., less than 0.1% by weight) of polymerized units of the multiethylenically unsaturated monomer.

The acrylic emulsion polymer useful in the present invention may further comprise, as polymerized units, one or more polymerizable surfactants. "Polymerizable surfactant" refers to a surfactant containing one ethylenically unsaturated bond. The polymerizable surfactants may have the structure of formula (I),

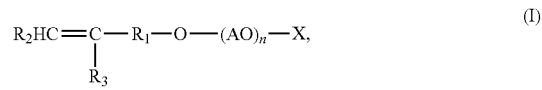

wherein $R_1$ is an alkyl substituted benzene group; an alkyl benzene substituted benzene group, an alkyl group having 1 to 20 carbon atoms; —$CH_2OCH_2CH(CH_2OR_4)$—, wherein $R_4$ is a $C_1$-$C_{20}$ alkyl group; a carboxyl group; or —$CH_2OCH_2CHR_5$—, wherein $R_5$ is a $C_1$-$C_{20}$ alkyl group or an alkyl substituted benzene group;

$R_2$ is hydrogen or a $C_1$-$C_{20}$ or $C_1$-$C_4$ alkyl group such as methyl;

$R_3$ is hydrogen or a $C_1$-$C_{20}$ or $C_1$-$C_4$ alkyl group such as methyl;

A represents an alkylene group or a substituted alkylene group, having 2 to 4 carbon atoms;

n represents an average addition mole number of alkylene oxide and is an integer in the range of from 0 to 1,000, from 1 to 30, from 5 to 20, or from 8 to 15; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$—COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue.

In one embodiment, the polymerizable surfactant useful in the present invention has the structure of formula (II),

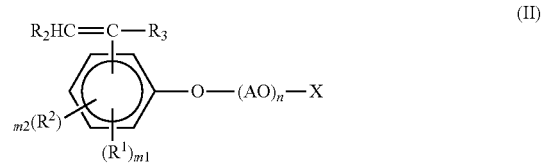

wherein $R^1$ is an alkyl group having 1 to 4 carbon atoms, $R^2$ is an alkyl substituted benzene group, m1 is 0 or 1; m2 is 0, 1, 2 or 3; and $R_2$, $R_3$, A, n and X are as defined above in formula (I).

In one embodiment, the polymerizable surfactant has the structure of formula (III),

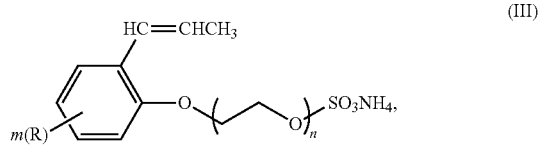

(III)

wherein R is a benzene group or a substituted benzene group; m is an integer of from 1 to 4 or from 1 to 3; and n is an integer of from 1 to 30, from 5 to 25, or from 7 to 15. R can be an alkyl substituted benzene group, preferably a $C_1$-$C_4$ alkyl substituted benzene group, and more preferably an ethyl substituted benzene group. In one embodiment, R is an ethyl substituted benzene group and m is 3.

The acrylic emulsion polymer useful in the present invention may comprise as polymerized units, based on the dry weight of the acrylic emulsion polymer, 0.25% by weight or more, 0.4% by weight or more, 0.5% by weight or more, 0.6% by weight or more, or even 0.8% by weight or more, and at the same time, 5% by weight or less, 3% by weight or less, 2% by weight or less, 1.5% by weight or less, or even 1% by weight or less, of the polymerizable surfactant.

In one embodiment, the acrylic emulsion polymer comprises as polymerized units, based on the dry weight of the acrylic emulsion polymer, from 60% to 99.9% by weight of the ethylenically unsaturated nonionic monomers such as, for example, styrene, butyl acrylate, ethyl acrylate, 2-ethylhexyl acrylate, or mixtures thereof; from 0.25% to 5% by weight of the polymerizable surfactant; from 0.1% to 5% by weight of the ethylenically unsaturated monomers having one or more functional groups such as, for example, acrylamide, acrylic acid, methacrylic acid, sodium styrene sulfonate, or mixtures thereof; and from 0 to 0.2% of the multiethylenically unsaturated monomer such as allyl methacrylate.

The acrylic emulsion polymer useful in the present invention may have a glass transition temperature of from −20° C. to 50° C., from 0° C. to 30° C., or from 5° C. to 30° C.

The acrylic emulsion polymer useful in the present invention may be prepared by free-radical polymerization, such as suspension polymerization or emulsion polymerization, of the polymerizable surfactant and the monomers including, for example, the ethylenically unsaturated nonionic monomer, the ethylenically unsaturated monomers having one or more functional groups, the multiethylenically unsaturated monomer, or mixtures thereof. Emulsion polymerization is a preferred process. Total weight concentration of the monomers and the polymerizable surfactant for preparing the acrylic emulsion polymer is equal to 100%. A mixture of the monomers and the polymerizable surfactant may be added neat or as an emulsion in water; or added in one or more additions or continuously, linearly or nonlinearly, over the reaction period of preparing the acrylic emulsion polymer. Temperature suitable for emulsion polymerization processes may be lower than 100° C., in the range of from 30° C. to 95° C., or in the range of from 50° C. to 90° C. Multistage free-radical polymerization using the monomers described above can be used, which at least two stages are formed sequentially, and usually results in the formation of the multistage polymer comprising at least two polymer compositions. In one embodiment, the acrylic emulsion polymer useful in the present invention is prepared by multistage emulsion polymerization.

In the polymerization process of preparing the acrylic emulsion polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the acrylic emulsion polymer, one or more non-polymerizable surfactants that contain no double bond may be used. Such non-polymerizable surfactants may be added prior to or during the polymerization of the monomers, or combinations thereof. A portion of the non-polymerizable surfactant can also be added after the polymerization. These surfactants may include anionic and/or nonionic emulsifiers. Examples of suitable non-polymerizable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The non-polymerizable surfactant, if present, may be used in an amount of from 0.1% to 6% by weight, preferably from 0.3% to 1.5% by weight, based on the weight of total monomers used for preparing the acrylic emulsion polymer.

In the polymerization process of preparing the acrylic emulsion polymer, a chain transfer agent may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the acrylic emulsion polymer. The chain transfer agent may be used in an amount of from 0 to 1% by weight, from 0.1% to 0.7% by weight, or from 0.2% to 0.5% by weight, based on the total weight of monomers used for preparing the acrylic emulsion polymer.

After completing the polymerization of the acrylic emulsion polymer, the obtained acrylic emulsion polymer dispersion may be neutralized by one or more bases as neutralizers to a pH value, for example, at least 6, from 6 to 10, or from 7 to 9. The bases may lead to partial or complete neutralization of the ionic or latently ionic groups of the acrylic emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The acrylic emulsion polymer dispersion may be further subject to stream stripping to further reduce the VOC content of the acrylic emulsion polymer dispersion. Process for stream stripping polymer dispersions are known in the art such as those described in U.S. Pat. No. 8,211,987B2 and U.S. Pat. No. 7,745,567B2.

The aqueous coating composition of the present invention may further comprise one or more polyoxypropylene polyols (that is, poly(propylene oxide) homopolymers). The polyoxypropylene polyol useful in the present invention may have a number average molecular weight ($M_n$) of 350 or more, 375 or more, or even 400 or more, and at the same time, 1,900 or less, 1,800 or less, 1,600 or less, 1,500 or less, 1,200 or less, 1,000 or less, or even 800 or less. $M_n$ herein may be measured by Size Exclusion Chromatography (SEC) or by calculation according to equation (i) below. For example, $M_n$ of the polyoxypropylene polyol can be measured by SEC on two Polymer Laboratories Mixed E columns (in tandem) with refractive index detector at 40° C. using polystyrene narrow standards. Molecular weights of polystyrene standards used for calibration range from 2329,000 to 580 g/mol. Peak molecular weight ($M_p$) used for calibration are values converted from peak molecular weight of each PS standard ("$M_{p-PS}$") according to the following equation: $M_p = 1.0951 * M_{p-PS}^{0.9369}$.

$M_n$ of the polyoxypropylene polyol can also be calculated by the following equation (i), $$M_n = \text{(functionality of polyol} * 56100\text{)/hydroxy number of polyol} \qquad (i)$$

wherein hydroxy number, reported in units of milligrams of KOH/gram of polyol, is measured according to the ASTM D4274-16 method (Standard Test Methods for Testing Polyurethane Raw Materials: Determination of Hydroxyl Numbers of Polyols).

Generally the polyoxypropylene polyol useful in the present invention may have an average hydroxy functionality of 2 or more or 3 or more, and at the same time, 6 or less, 5 or less, or even 4 or less.

The polyoxypropylene polyol useful in the present invention may be initiated with, for example, water, organic dicarboxylic acids such as succinic acid, adipic acid, phthalic acid, terephthalic acid; or polyhydric alcohols (such as dihydric to pentahydric alcohols or dialkylene glycols), for example, ethanediol, 1,2- and 1,3-propanediol, diethylene glycol, dipropylene glycol, 1,4-butanediol, 1,6-hexanediol, glycerol, trimethylolpropane, pentaerythritol, sorbitol, and sucrose or blends thereof; linear or cyclic amine compounds which may also contain a tertiary amine such as ethanoldiamine, triethanoldiamine, and various isomers of toluene diamine, methyldiphenylamine, aminoethylpiperazine, ethylenediamine, N-methyl-1,2-ethanediamine, N-methyl-1,3-propanediamine, N,N-dimethyl-1,3-diaminopropane, N,N-dimethylethanolamine, diethylene triamine, bis-3-aminopropyl methylamine, aniline, aminoethyl ethanolamine, 3,3-diamino-N-methylpropylamine, N,N-dimethyldipropylenetriamine, aminopropyl-imidazole and mixtures thereof; or combinations thereof.

Examples of suitable polyoxypropylene polyols include VORANOL™ WD2104 polyol, VORANOL CP450 polyol, and VORANOL RN482 polyol, all available from The Dow Chemical Company, or mixtures thereof (VORANOL is a trademark of The Dow Chemical Company).

The polyoxypropylene polyol useful in the present invention may be present, based on the total weight of the aqueous coating composition, in an amount of 0.3% by weight or more, 0.4% by weight or more, 0.5% by weight or more, 0.6% by weight or more, 0.7% by weight or more, 0.8% by weight or more, or even 1% by weight or more, and at the same time, 3% by weight or less, 2.5% by weight or less, 2% by weight or less, 1.9% by weight or less, 1.8% by weight or less, 1.7% by weight, 1.6% by weight or less, 1.5% by weight or less, or even 1.2% by weight or less.

The aqueous coating composition of the present invention may further comprise one or more epoxy-containing polysiloxane oligomers. The epoxy-containing polysiloxane oligomers may have the structure of formula (IV):

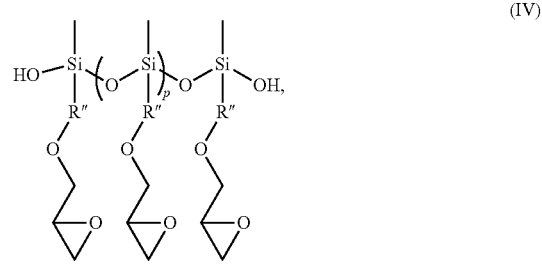

(IV)

wherein R" is —CH$_2$CH$_2$CH$_2$—; and p is an integer of from 0 to 4, from 0 to 3, or from 1 to 3. The epoxy-containing polysiloxane oligomer can be a mixture of oligomers having the structure of formula (IV) with different p values, for example, 0, 1, 2 or 3.

In one embodiment, the epoxy-containing polysiloxane oligomer useful in the present invention comprises, (i) a polysiloxane of formula (IV), wherein p=0; (ii) a polysiloxane of formula (IV), wherein p=1; (iii) a polysiloxane of formula (IV), wherein p=2; and (iv) a polysiloxane of formula (IV), wherein p=3.

The epoxy-containing polysiloxane oligomer useful in the present invention may be present, based on the dry weight of the acrylic emulsion polymer, in an amount of 0 or more, 0.01% by weight or more, 0.05% by weight or more, 0.1% by weight or more, 0.15% by weight or more, or even 0.2% by weight or more, and at the same time, 3% by weight or less, 2.5% by weight or less, 1.5% by weight or less, 1% by weight or less, 0.8% by weight, 0.5% by weight or less, or even 0.4% by weight or less. Suitable commercially available epoxy-containing polysiloxane oligomers may include CoatOSil MP 200 silane available from Momentive Performance Materials Inc.

In one embodiment, the aqueous coating composition of the present invention comprises the acrylic emulsion polymer comprising, as polymerized units, the polymerizable surfactant having the structure of formula (II) described above; from 0.3% to 1.9% by weight of the polyoxypropylene polyol, based on the total weight of the coating composition; and from 0.1% to 1.5% by weight, based on the dry weight of the acrylic emulsion polymer, of the epoxy-containing polysiloxane oligomer.

The aqueous coating composition of the present invention may comprise one or more additional anti-freeze agents that are different from the polyoxypropylene polyol described above without contributing VOCs. Specific examples of additional anti-freeze agents include polyethylene glycol, RHODOLINE FT-100 freeze thaw stabilizer available from Solvay, or mixtures thereof. The additional anti-freeze agent, if present, should be in an amount without compromising stain resistance of coatings made therefrom. For example, the aqueous coating composition may comprise, based on the total weight of the aqueous coating composition, less than 3% by weight, less than 2% by weight, or even less than 1% by weight, of the additional anti-freeze agents. Preferably, the aqueous coating composition is substantially free (e.g., includes less than 0.3% by weight, and preferably less than 0.1% by weight) of the additional anti-freeze agents.

The aqueous coating composition of the present invention may further comprise pigments and/or extenders. "Pigment" herein refers to a particulate inorganic material which is capable of materially contributing to the opacity or hiding capability of a coating. Such materials typically have a refractive index greater than 1.8. Inorganic pigments typically include metal oxides. Examples of suitable metal oxides include titanium dioxide ($TiO_2$), zinc oxide, iron oxide, zinc sulfide, barium sulfate, barium carbonate, or mixtures thereof. In a preferred embodiment, pigment used in the present invention is $TiO_2$. $TiO_2$ typically exists in two crystal forms, anastase and rutile. Suitable commercially available $TiO_2$ include, for example, KRONOS 2310 available from Kronos Worldwide, Inc., Ti-Pure R-706 available from DuPont (Wilmington, Del.), TiONA AT1 available from Millenium Inorganic Chemicals, or mixtures thereof. $TiO_2$ may be also available in concentrated dispersion form. "Extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 30% to 65%, from 40% to 60%, or from 45% to 55%. PVC may be determined according to the following equation:

$$PVC = \frac{\text{Volume of Pigment and extender}}{\text{Dry volume of the coating composition}} \times 100\%.$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The concentration of the defoamer may be, based on the total weight of the aqueous coating composition, generally from 0 to 1% by weight, from 0.01% to 0.8% by weight, or from 0.05% to 0.5% by weight.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is a hydrophobically-modified hydroxy ethyl cellulose (HMHEC). The concentration of the thickener may be, based on the total weight of the aqueous coating composition, generally from 0 to 5% by weight, from 0.05% to 2% by weight, or from 0.1% to 1% by weight.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL 104 nonionic wetting agent based on an actacetylenic diol available from Air Products, BYK-346 and BYK-349 polyether-modified siloxanes both available from BYK, or mixtures thereof. The concentration of the wetting agent may be, based on the total weight of the aqueous coating composition, from 0 to 5% by weight, from 0.01% to 2% by weight, or from 0.2% to 1% by weight.

The aqueous coating composition of the present invention may further comprise one or more coalescents with a high boiling point. "High boiling point" herein refers to a boiling point higher than 280° C. Examples of suitable coalescents include COASOL 290 Plus coalescent (a mixture of di-esters) available from Chemoxy International Ltd., OPTI-FILM Enhancer 400 coalescent available from Eastman, or mixtures thereof. The concentration of the coalescents may be, based on the total weight of the aqueous coating composition, from 0 to 10% by weight, from 0.01% to 9% by weight, or from 1% to 8% by weight.

The aqueous coating composition of the present invention may further comprise one or more dispersants. Suitable dispersants include, for example, anionic polyelectrolyte dispersants such as co-polymerized maleic acid, co-polymers including co-polymerized acrylic acid, co-polymers including co-polymerized methacrylic acid, and the like; carboxylic acids containing molecules such as tartaric acid, succinic acid, and citric acid; or mixtures thereof. The concentration of the dispersant may be, based on the total weight of the aqueous coating composition, from 0 to 2.0% by weight, from 0.05% to 1.5% by weight, or from 0.1% to 1.0% by weight.

In addition to the components described above, the aqueous coating composition of the present invention may further comprise any one or combination of the following additives: buffers, neutralizers, humectants, mildewcides, biocides, anti-skinning agents, colorants, flowing agents, anti-oxidants, plasticizers, leveling agents, adhesion promoters, and grind vehicles. When present, these additives may be present in a combined amount of from 0.001% to 10% by weight or from 0.01% to 2% by weight, based on the total weight of the composition.

The aqueous coating composition of the present invention may further comprise water. The concentration of water may be, by weight based on the total weight of the aqueous composition, from 30% to 90%, from 40% to 80%, or from 50% to 70%.

The aqueous coating composition of the present invention may be prepared by admixing the acrylic emulsion polymer and the polyoxypropylene polyol, and preferably with the epoxy-containing polysiloxane oligomer and other optional components, e.g., pigments and/or extenders as described above. Components in the aqueous coating composition may be mixed in any order to provide the aqueous coating composition of the present invention. Any of the above-mentioned optional components may also be added to the composition during or prior to the mixing to form the aqueous coating composition. When the aqueous coating composition comprises the epoxy containing polysiloxane oligomer, the epoxy containing polysiloxane oligomer is preferably mixed with the acrylic emulsion polymer prior to mixing with other components in the aqueous coating composition. When the aqueous coating composition comprises pigment and/or extender, the pigments and/or extenders are preferably mixed with the dispersant to form a slurry of pigments and/or extender.

The aqueous coating composition of the present invention may comprise not greater than 5 grams of volatile organic compounds (VOCs) per liter (g/L) of the aqueous coating composition according to the GB 18582-2008 method. Preferably, the VOC content of the aqueous coating composition is less than 3 g/L, less than 2.5 g/L, or even less than 2 g/L.

Surprisingly, the aqueous coating composition of the present invention can have good freeze-thaw stability while achieving good stain resistance, for example, as indicated by a total stain removal score of at least 60 according to the GB/T9780-2013 method. "Good freeze-thaw stability" (that is, being freeze-thaw stable) means that a composition can be subjected to three freeze-thaw cycles showing no coagulation and showing a viscosity change in Krebs Units (KU) of 15 or less, preferably 10 or less, according to the test method described in the Examples section below.

The present invention also relates to a process of using the aqueous coating composition of the present invention may comprise the following: applying the coating composition to a substrate, and drying, or allowing to dry, the applied coating composition. The present invention also provides a method of preparing a coating. The method may comprise forming the aqueous coating composition of the present invention, applying the aqueous coating composition to a substrate, and drying, or allowing to dry, the applied coating composition to form the coating.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The aqueous coating composition, preferably comprising the pigment, is suitable for various applications such as marine and protective coatings, automotive coatings, traffic paint, Exterior Insulation and Finish Systems (EIFS), roof mastic, wood coatings, coil coatings, plastic coatings, powder coatings, can coatings, architectural coatings, and civil engineering coatings. The aqueous coating composition is particularly suitable for architectural coatings.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, The aqueous coating composition can dry, or allow to dry, to form a film (this is, coating) at room temperature (20-25° C.), or at an elevated temperature, for example, from 35° C. to 60° C.

The present invention also relates to a method of imparting freeze-thaw stability to an acrylic emulsion polymer comprising: mixing the acrylic emulsion polymer with a polyoxypropylene polyol having a number average molecular weight of from 350 to 1,900, thus to form a composition. The composition obtained from this method comprising the acrylic emulsion polymer and the polyoxypropylene polyol may have a VOC content of 5 g/L or less. The composition can provide coating compositions comprising thereof with good freeze-thaw stability and provide coatings with good stain resistance. Good freeze-thaw stability and good stain resistance are defined above. The polyoxypropylene polyol and the acrylic emulsion polymer are as described above in the aqueous coating composition section. For example, the acrylic emulsion polymer comprises, as polymerized units, a polymerizable surfactant. The composition obtained from the method is preferably the aqueous coating composition as described above.

EXAMPLES

Some embodiments of the invention will now be described in the following Examples, wherein all parts and percentages are by weight unless otherwise specified. The following materials are used in the examples:

Styrene ("ST"), acrylic acid ("AA"), butyl acrylate ("BA"), and acrylamide ("AM") are all available from The Dow Chemical Company.

RHODOLINE WA1802 ("WA1802"), available from Solvay, is an alkoxylate polyarylphenol derivative.

Sodium dodecyl (Linear) benzene sulfonate ("SDBS") is available from Congnis and used as a surfactant.

HITENOL AR-1025, available from Dai-Ichi Kogyo Seiyaku Co. Ltd., is a polyoxyethylene styrenated propenyl phenyl ether sulfate ammonium salt.

REASOAP SR-1025 anionic polymerizable emulsifier ("SR-1025"), available from ADEKA company, is poly(oxy-1,2-ethanediyl),alpha-sulfo-omega-[1-(hydroxymethyl)-2-(2-propenyloxy)ethoxyl]-,C11-rich C10-14-branched alkyl ethers, ammonium salts.

Ethylene glycol is available from Sinopharm Chemical Reagent Co., Ltd.

DISPERSOGEN LFH anti-freeze agent ("LFH"), available from Clariant, is a tristyrylphenol polyoxy ethylene phosphoric acid ester (anionic).

CoatOSil MP 200 silane ("MP 200"), available from Momentive Performance Materials Inc., is an oligomer silane containing epoxy groups.

SILQUEST A-171 silane ("A-171"), available from Momentive Performance Materials Inc., is a vinyl trimethoxysilane.

CARBOWAX™ Polyethylene Glycol 400 ("PEG 400") is available from The Dow Chemical Company.

NATROSOL™ 250 HBR hydroxyethylcellulose, available from Ashland Aqualon Company, is used as a thickener.

TAMOL™ 731A dispersant, available from The Dow Chemical Company, is a hydrophobic copolymer (TAMOL is a trademark of The Dow Chemical Company).

TERGITOL™ 15-S-40 nonionic surfactant is available from The Dow Chemical Company (TERGITOL is a trademark of The Dow Chemical Company).

AMP-95™ neutralizer, available from The Dow Chemical Company, is 2-methyl-2-amino-propanol (AMP-95 is a trademark of The Dow Chemical Company).

LOMON R-996 titanium dioxide is available from Si Chuan Lomon Titanium Industry Co., Ltd.

CELITE 499SP diatomite is available from IRI new materials Co., Ltd.

DB-80 calcined kaolin is available from Inner Mongolia Super Building Material Technology Co., Ltd.

Talc AT-1, available from Liaoning Haicheng Liluoxue TALC Limited Company, is a hydrated magnesium silicate.

ROPAQUE Ultra E opaque polymer is available from The Dow Chemical Company.

FOAMASTER NXZ defoamer is available from Cognis Co. Ltd.

COASOL 290 Plus coalescent is available from Chemoxy International Ltd.

ACRYSOL™ RM-8W rheology modifier, available from The Dow Chemical Company, is a nonionic urethane type polymer (ACRYSOL is a trademark of The Dow Chemical Company).

ACRYSOL RM-2020 NPR rheology modifier, available from The Dow Chemical Company, is a nonionic hydrophobically modified ethylene oxide urethane (HEUR).

The follows polyols are all available from The Dow Chemical Company,

VARANOL CP450 polyol ("CP450 polyol") is a polyoxypropylene polyol having $M_n$ of about 450 and an average hydroxy functionality of 3.

VORANOL 2000 LM polyol ("2000 LM polyol") is a polyoxypropylene polyol having $M_n$ of about 2,000 and an average hydroxy functionality of 2.

VORANOL WD2104 polyol ("WD2104 polyol") is a polyoxypropylene polyol having $M_n$ of about 410 and an average hydroxy functionality of 2.

VORANOL RN482 polyol ("RN482 polyol") is a polyoxypropylene polyol having $M_n$ of about 700 and an average hydroxy functionality of 6.

VORANOL 223-060LM polyol ("223-060LM polyol") is an ethylene oxide capped polyoxypropylene polyol having $M_n$ of about 2,000 and an average hydroxy functionality of 2.

The following standard analytical equipment and methods are used in the Examples.

Freeze-Thaw Stability

Containers were filled with 75% volume of a test coating composition. The containers were sealed and placed into a freezer at −6° C. for 16 hours, and then taken out from the freezer to allow to thaw at room temperature for 8 hours. This completes one F/T cycle. The freeze-thaw cycles were continued until the sample coagulated or to a maximum of three cycles. After each cycle, the coating composition was observed for coagulation or gel. After the completion of 3 cycles, the samples were shaken manually to observe the appearance. If the samples coagulated or had grits separated from the samples as observed by the naked eye, the samples rated as "Fail". If the samples did not coagulate or showed no grits after the Freeze-Thaw test, evaluation of the viscosity change in KU, ΔKU, is needed.

Initial KU of the test coating composition at room temperature was recorded prior to the three F/T cycles described above. After the three F/T cycles were completed and the temperature of the coating composition recovered to room temperature, viscosity of the coating composition at room temperature was measured and recorded as final KU. KU values of a coating composition were tested by a Brookfield viscosity meter according to ASTM D 562-2001 standard. The difference between initial and final KU is reported as the viscosity change, ΔKU. If the sample did not coagulate or showed no grits, and showed ΔKU of 15 or less, the sample was rated as "Pass" indicating good freeze-thaw stability. Otherwise, if the sample showed ΔKU higher than 15, the sample was rated as "Fail" indicating poor freeze-thaw stability. The lower the ΔKU value, the better the freeze-thaw stability.

Stain Resistance

The stain resistance of coatings was evaluated according to the GB/T9780-2013 method. A test coating composition was coated on black vinyl scrub charts using a 150 μm film caster. The obtained coated panel was cured for 7 days at room temperature before stains were applied. Six 25 mm width×100 mm length test areas were marked across the test panel. Then six types of stains (vinegar, black tea, ink, water black, alcohol black, and Vaseline black) were applied on the coatings on the panel to fill in each test area. Liquid stains were applied over gauze to prevent them from bleeding into the other stained areas. Stains stayed on the panel for 2 hours before excess stains were wiped off. The panel was then placed on a scrub tester under a 1.5 kg weight and scrubbed for 200 cycles at a scrub rate of 37 cycles/min. The panel was then removed from the scrub tester, rinsed with running water, and hung up to dry. Each stain area was then evaluated by measuring the change of reflection index (X) by the following formula, $$X = \frac{Y_1}{Y_0} \times 100,$$

where $Y_1$ is reflection index after the stain removal test and $Y_0$ is reflection index before the stain removal test. $Y_1$ and $Y_0$ were tested by BYK spectro-guide instrument.

Based on the obtained X value, the stain removal score (Ri) for each stain, on a scale of 1 to 10, can be obtained from the below table,

| R | vinegar | black tea | ink | water black | alcohol black | Vaseline black |
|---|---|---|---|---|---|---|
| 10 | 99 < X ≤ 100 | 98 < X ≤ 100 | 96 < X ≤ 100 | 96 < X ≤ 100 | 95 < X ≤ 100 | 99 < X ≤ 100 |
| 9 | 98 < X ≤ 99 | 95 < X ≤ 98 | 91 < X ≤ 96 | 91 < X ≤ 96 | 89 < X ≤ 95 | 98 < X ≤ 99 |
| 8 | 97 < X ≤ 98 | 91 < X ≤ 95 | 85 < X ≤ 91 | 85 < X ≤ 91 | 82 < X ≤ 89 | 97 < X ≤ 98 |
| 7 | 96 < X ≤ 97 | 86 < X ≤ 91 | 78 < X ≤ 85 | 78 < X ≤ 85 | 74 < X ≤ 82 | 96 < X ≤ 97 |
| 6 | 95 < X ≤ 96 | 80 < X ≤ 86 | 70 < X ≤ 78 | 70 < X ≤ 78 | 65 < X ≤ 74 | 95 < X ≤ 96 |
| 5 | 93 < X ≤ 95 | 73 < X ≤ 80 | 61 < X ≤ 70 | 61 < X ≤ 70 | 55 < X ≤ 65 | 93 < X ≤ 95 |
| 4 | 90 < X ≤ 93 | 65 < X ≤ 73 | 51 < X ≤ 61 | 51 < X ≤ 61 | 44 < X ≤ 55 | 90 < X ≤ 93 |
| 3 | 86 < X ≤ 90 | 56 < X ≤ 65 | 40 < X ≤ 51 | 40 < X ≤ 51 | 32 < X ≤ 44 | 86 < X ≤ 90 |
| 2 | 81 < X ≤ 86 | 46 < X ≤ 56 | 28 < X ≤ 40 | 28 < X ≤ 40 | 19 < X ≤ 32 | 81 < X ≤ 86 |
| 1 | X ≤ 81 | X ≤ 46 | X ≤ 28 | X ≤ 28 | X ≤ 19 | X ≤ 81 |

Then, the total stain removal score (R') was calculated according to the formula listed below, $$R' = \frac{\sum_{i=1}^{n=6} R_i}{n} \times 10,$$

where Ri is the stain removal score for each stain and n is 6. The total stain removal score (R') being 60 or higher means good stain resistance. Otherwise, the total stain removal score less than 60 is not acceptable. The higher the total stain removal score, the better stain resistance.

Synthesis of Polymer Emulsion 1

Monomer Emulsion (ME) was prepared by mixing 375.7 g of deionized (DI) water, 51.84 g of AR-1025, 645.74 g of ST, 840.81 g of BA, 9.08 g of AM, and 24.47 g of AA.

In a 5-liter, four necked round bottom flask equipped with a paddle stirrer, a thermometer, nitrogen inlet and a reflux condenser, 608.40 g of DI water was added and heated to 90° C. under nitrogen atmosphere with stirring. 12.11 g of AR-1025, 3.82 g of $Na_2CO_3$, and 58.5 g of ME seed were then added into the flask, quickly followed by 5.35 g of sodium persulfate dissolved in 19.5 g of DI water. Upon holding the batch for 1 minute with stirring, ME was added into the flask while co-feeding 5.35 g of sodium persulfate catalyst and 1.34 g of sodium bisulfite activator solution in 100 minutes. When the ME feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer separately. Then monoethanolamine (MEA) solution was added to adjust the pH to 7.5-8.5. At last, 5.03 g of CoatOSil MP 200 were post added slowly. The obtained polymer emulsion had a measured particle size of about 150 nanometers (nm) and solids of about 50%.

Synthesis of Polymer Emulsion 2, Polymer Emulsion 3, and Polymer Emulsion 4

Polymer Emulsion 2, Polymer Emulsion 3, and Polymer Emulsion 4 were each independently prepared according to the same procedure as preparing Polymer Emulsion 1 described above, except that the surfactants used in preparing Polymer Emulsion 1 (including 51.84 g of AR-1025 present in ME and 12.11 g of AR-1025 directly added into the reaction flask) were replaced by other surfactants. Type and dosage of the surfactants are given in the below Table. The obtained polymer emulsions all had a measured particle size of about 150 nm and solids of about 50%.

| | Polymer Emulsion 2 | | Polymer Emulsion 3 Surfactant | | Polymer Emulsion 4 | |
|---|---|---|---|---|---|---|
| | SR1025 | | SDBS | | WA1802 | |
| | ME | Reaction flask | ME | Reaction flask | ME | Reaction flask |
| Amount (g) | 51.84 | 12.11 | 55.79 | 23.91 | 51.84 | 14.53 |

The above obtained polymer emulsions were used to prepare coating compositions below, based on formulations given in Table 1. Types of polymer emulsions, and dosage and types of anti-freeze agents used in preparing the coating compositions are given in Table 2.

Example (Ex) 1 Coating Composition

The aqueous coating composition of Ex 1 was prepared by a two-stage process, based on formulations listed in Table 1. First, components in the first grind stage were mixed with a high-shear mixer. Sufficient agitation (usually 1,300-1,500 rpm) was required to obtain a homogeneous dispersion of pigment. After the grind stage, a viscous mill base was obtained. In the second letdown stage, the viscous mill base was mixed with the remaining components including polymer emulsion synthesized above (Polymer Emulsion 1 for Ex 1). At the same time, a high shear agitator was replaced with a low shear mixer (usually 500-700 rpm) to avoid foaming and unstable grits. After all the components were added in the mill base and agitated for about 30 minutes, a homogeneous coating composition was obtained.

TABLE 1

| Coating Composition | |
|---|---|
| Grind | Gram |
| Water | 100.00 |
| NATROSOL 250 HBR thickener | 1.00 |
| TAMOL 731A dispersant | 6.25 |
| TERGITOL 15-S-40 surfactant | 1.00 |
| AMP-95 neutralizer | 0.06 |
| R-996 | 95.00 |
| Celite 499 | 12.50 |
| DB-80 | 60.00 |
| Talc AT-1 | 27.50 |
| Water | 5.00 |
| LetDown | Grams |
| Polymer Emulsion | 150.00 |
| VORANOL CP450 polyol (anti-freeze agent) | 5.00 |
| ROPAQUE Ultra E opaque polymer | 25.00 |
| FOAMASTER NXZ defoamer | 2.00 |

TABLE 1-continued

| Coating Composition | |
|---|---|
| COASOL 290 Plus coalescent | 2.10 |
| ACRYSOL RM-8W rheology modifier | 1.00 |
| ACRYSOL RM-2020 NPR rheology modifier | 2.50 |
| Water | 4.09 |
| subtotal | 500.00 |

Ex 2 Coating Composition

The coating composition of Ex 2 was prepared according the same procedure as described above in Ex 1, except that the dosage of CP450 polyol in Ex 2 was increased to 1.5% by weight of the total weight of the coating composition. The amount of water was adjusted to make up a total weight of the coating composition of Ex 2 of 500 grams.

Ex 3 Coating Composition

The coating composition of Ex 3 was prepared according the same procedure as described above in Ex 1, except that the anti-freeze agent used in Ex 3 was 1% by weight of WD2104 polyol, based on the total weight of the coating composition.

Ex 4 Coating Composition

The coating composition of Ex 4 was prepared according the same procedure as described above in Ex 1, except that the anti-freeze agent used in Ex 4 was 1% by weight of RN482 polyol, based on the total weight of the coating composition.

Ex 5 Coating Composition

The coating composition of Ex 5 was prepared according the same procedure as described above in Ex 1, except that the dosage of CP450 polyol in Ex 5 was increased to 1.8% by weight of the total weight of the coating composition. The amount of water was adjusted to make up a total weight of the coating composition of Ex 5 of 500 grams.

Ex 6 Coating Composition

The coating composition of Ex 6 was prepared according the same procedure as described above in Ex 1, except that the polymer emulsion used in Ex 6 was Polymer Emulsion 2 and the anti-freeze agent used in Ex 6 was 1.5% by weight of CP450 polyol, based on the total weight of the coating composition. The amount of water was adjusted to make up a total weight of the coating composition of Ex 6 of 500 grams.

Comp Ex A Coating Composition

The coating composition of Comp Ex A was prepared according the same procedure as described above in Ex 1, except that the anti-freeze agent used in Comp Ex A was 1% by weight of 2000LM polyol, based on the total weight of the coating composition.

Comp Ex B Coating Composition

The coating composition of Comp Ex B was prepared according the same procedure as described above in Ex 1, except that the anti-freeze agent used in Comp Ex B was 1% by weight of 223-060LM polyol, based on the total weight of the coating composition.

Comp Ex C Coating Composition

The coating composition of Comp Ex C was prepared according the same procedure as described above in Ex 1, except that the anti-freeze agent used in Comp Ex C was 2% by weight of PEG 400, based on the total weight of the coating composition. The amount of water was adjusted to make up a total weight of the coating composition of Comp Ex C of 500 grams.

Comp Ex D Coating Composition

The coating composition of Comp Ex D was prepared according the same procedure as described above in Ex 1, except that the anti-freeze agent used in Comp Ex D was 3% by weight of LFH, based on the total weight of the coating composition. The amount of water was adjusted to make up a total weight of the coating composition of Comp Ex D of 500 grams.

Comp Ex E Coating Composition

The coating composition of Comp Ex E was prepared according the same procedure as described above in Ex 1, except that Polymer Emulsion 3 was used in Comp Ex E.

Comp Ex F Coating Composition

The coating composition of Comp Ex F was prepared according the same procedure as described above in Ex 1, except that Polymer Emulsion 4 was used in Comp Ex F. Table 2 also gives properties of the above coating compositions and coatings made therefrom. As shown in Table 2, the coating composition of Comp Ex A comprising 1% 2000LM polyol ($M_n$=2,000) showed poor F/T stability and provided coatings with unacceptable stain resistance. The coating compositions comprising 1% 223-060LM ethylene oxide capped polyol (Comp Ex B) or 3% LFH (Comp Ex D) both provided coatings with poor stain resistance. The coating composition comprising 2% PEG 400 (Comp Ex C) showed poor F/T stability. The coating compositions comprising polymer emulsions prepared in the presence of non-polymerizable surfactants such as SDBS (Comp Ex E) or WA1802 (Comp Ex F) both showed poor F/T stability.

In contrast, the coating composition of the present invention (Exs 1-6) showed good F/T stability and provided coatings with good stain resistance as indicated by a total stain remove score of 60 or higher measured by the GB/T9780-2013 method. The coating compositions of Exs 1-6 all had a VOC content of less than 2 g/L.

TABLE 2

| | Polymer Emulsion | Anti-freeze agent[1] | $M_n$ of anti-freeze agent | Total stain removal score[2] | F/T test | ΔKU | VOC[3] |
|---|---|---|---|---|---|---|---|
| Ex 1 | Polymer Emulsion 1 | 1% CP450 polyol | 450 | 64 | Pass | 8.7 | <2 g/L |
| Ex 2 | Polymer Emulsion 1 | 1.5% CP450 polyol | 450 | 60 | Pass | 6.6 | <2 g/L |
| Ex 3 | Polymer Emulsion 1 | 1% WD2104 polyol | 410 | 62 | Pass | 8.5 | <2 g/L |
| Ex 4 | Polymer Emulsion 1 | 1% RN482 polyol | 700 | 63 | Pass | 8.4 | <2 g/L |
| Ex 5 | Polymer Emulsion 1 | 1.8% CP450 polyol | 450 | 60 | Pass | 13.8 | <2 g/L |
| Ex 6 | Polymer Emulsion 2 | 1.5% CP450 polyol | 450 | 65 | Pass | 14.1 | <2 g/L |
| Comp Ex A | Polymer Emulsion 1 | 1% 2000LM polyol | 2000 | 53 | Fail | NA | <2 g/L |
| Comp Ex B | Polymer Emulsion 1 | 1% 223-060LM polyol | 2000 | 58 | Pass | 9.9 | <2 g/L |
| Comp Ex C | Polymer Emulsion 1 | 2% PEG 400 | NA | NA | Fail | NA | <2 g/L |
| Comp Ex D | Polymer Emulsion 1 | 3% LFH | NA | 42 | Pass | 8.5 | <2 g/L |
| Comp Ex E | Polymer Emulsion 3 | 1% CP450 polyol | NA | 57 | Fail | NA | <2 g/L |
| Comp Ex F | Polymer Emulsion 4 | 1% CP450 polyol | NA | NA | Fail | NA | <2 g/L |

[1]Dosage of anti-freeze agent is by weight based on the total weight of the coating composition;
[2]Total stain removal scores were measured according to the GB/T 9780-2013 method as described above in the test methods section;
[3]VOC was measured according to the GB 18582-2008 method; and
NA means not available.

What is claimed is:

1. An aqueous coating composition having a VOC content of 5 g/L or less, comprising
an acrylic emulsion polymer comprising, as polymerized units, a polymerizable surfactant; and
a polyoxypropylene polyol having a number average molecular weight of from 350 to 1,900.

2. The aqueous coating composition of claim 1, wherein the polyoxypropylene polyol is present in an amount of from 0.3% to 1.9% by weight, based on the total weight of the aqueous coating composition.

3. The aqueous coating composition of claim 1, further comprising an epoxy-containing polysiloxane oligomer.

4. The aqueous coating composition of claim 1, wherein the polymerizable surfactant has the structure of formula (I),

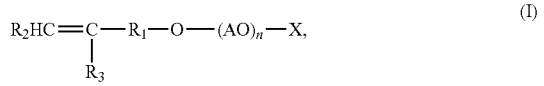

wherein $R_1$ is an alkyl substituted benzene group; an alkyl benzene substituted benzene group; an alkyl group having 1 to 20 carbon atoms; —$CH_2OCH_2CH(CH_2OR_4)$—, wherein $R_4$ is a $C_1$-$C_{20}$ alkyl group; a carboxyl group; or —$CH_2OCH_2CHR_5$—, wherein $R_5$ is a $C_1$-$C_{20}$ alkyl group or an alkyl substituted benzene group;

$R_2$ is hydrogen or a $C_1$-$C_{20}$ alkyl group;

$R_3$ is hydrogen or a $C_1$-$C_{20}$ alkyl group;

A represents an alkylene group or a substituted alkylene group, having 2 to 4 carbon atoms;

n is an integer in the range of from 0 to 1,000; and

X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—CH($SO_3M$)—COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue.

5. The aqueous coating composition of claim 1, wherein the polymerizable surfactant has the structure of formula (II),

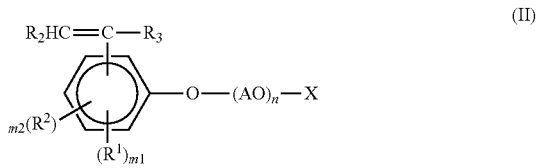

wherein $R^1$ is an alkyl group having 1 to 4 carbon atoms, $R^2$ is an alkyl substituted benzene group, m1 is 0 or 1, and m2 is 0, 1, 2 or 3; and wherein $R_2$ is hydrogen or a $C_1$-$C_{20}$ alkyl group, $R_3$ is hydrogen or a $C_1$-$C_{20}$ alkyl group, A represents an alkylene group or a substituted alkylene group, having 2 to 4 carbon atoms, n is an integer in the range of from 0 to 1,000, and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$—COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue.

6. The aqueous coating composition of claim 3, wherein the epoxy-containing polysiloxane oligomer has the structure of formula (IV),

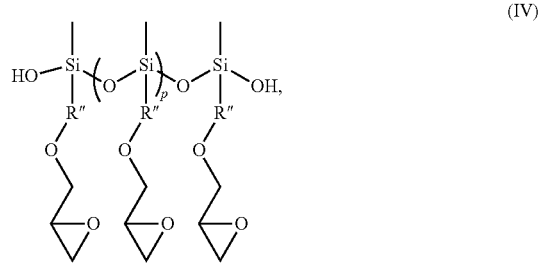

wherein R" is —$CH_2CH_2CH_2$— and p is an integer of from 0 to 4.

7. The aqueous coating composition of claim 3, wherein the epoxy-containing polysiloxane oligomer is present, based on the dry weight of the acrylic emulsion polymer, in an amount of from 0.1% to 1.5% by weight.

8. The aqueous coating composition of claim 1, wherein the acrylic emulsion polymer comprises as polymerized units, based on the dry weight of the acrylic emulsion polymer, from 0.25% to 5% by weight of the polymerizable surfactant.

9. The aqueous coating composition of claim 1, wherein the polyoxypropylene polyol has an average hydroxy functionality of from 2 to 6.

10. The aqueous coating composition of claim 1, wherein the polyoxypropylene polyol has a number average molecular weight of from 380 to 1,200.

11. The aqueous coating composition of claim 1, wherein the acrylic emulsion polymer has a glass transition temperature of from −10° C. to 40° C.

12. The aqueous coating composition of claim 1, comprising:

the acrylic emulsion polymer comprising, as polymerized units, the polymerizable surfactant having the structure of formula (II),

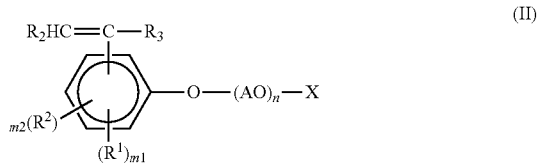

wherein $R^1$ is an alkyl group having 1 to 4 carbon atoms, $R^2$ is an alkyl substituted benzene group, m1 is 0 or 1, and m2 is 0, 1, 2 or 3; and wherein $R_2$ is hydrogen or a $C_1$-$C_{20}$ alkyl group; $R_3$ is hydrogen or a $C_1$-$C_{20}$ alkyl group; A represents an alkylene group or a substituted alkylene group, having 2 to 4 carbon atoms; n is an integer in the range of from 0 to 1,000; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$—COOM, wherein a and b are each independently an integer of from 0 to 4; Z represents a residual obtained by removing X from the general formula (I); and each M represents hydrogen, an alkali metal atom, an alkaline earth metal atom, an ammonium residue, or an alkanolamine residue;

from 0.3% to 1.9% by weight of the polyoxypropylene polyol, based on the total weight of the aqueous coating composition; and from 0.1% to 1.5% by weight of an epoxy-containing polysiloxane oligomer, based on the dry weight of the acrylic emulsion polymer.

13. A method of preparing the aqueous coating composition of claim 1, comprising:

mixing an acrylic emulsion polymer with a polyoxypropylene polyol to form the aqueous coating composition;

wherein the acrylic emulsion polymer comprises, as polymerized units, a polymerizable surfactant; and the polyoxypropylene polyol has a number average molecular weight of from 350 to 1,900.

14. A method of imparting freeze-thaw stability to an acrylic emulsion polymer, comprising mixing the acrylic emulsion polymer with a polyoxypropylene polyol having a number average molecular weight of from 350 to 1,900, wherein the acrylic emulsion polymer comprises, as polymerized units, a polymerizable surfactant.

* * * * *